United States Patent
Cho

Patent Number: 5,870,280
Date of Patent: Feb. 9, 1999

[54] BASE FOR LIQUID CRYSTAL DISPLAY HAVING RECEPTACLE FOR ACCESSORIES

[75] Inventor: Yu-Hsin Cho, Taipei Hsien, Taiwan

[73] Assignee: Compal Electronics, Inc., Taipei, Taiwan

[21] Appl. No.: 881,988

[22] Filed: Jun. 25, 1997

[51] Int. Cl.⁶ .............................. G06F 1/16; H05K 5/02
[52] U.S. Cl. .................... 361/681; 248/349.1; 248/921
[58] Field of Search .................... 361/681, 682, 361/683; 248/918, 921, 922, 923, 371, 397, 398, 346.01, 346.06, 415, 917, 131, 919, 349.1

[56] References Cited

U.S. PATENT DOCUMENTS

| | | | |
|---|---|---|---|
| 2,527,132 | 10/1950 | Jackson et al. | 248/131 |
| 2,922,609 | 1/1960 | Collier | 248/921 |
| 4,365,779 | 12/1982 | Bates et al. | 248/371 |
| 4,555,081 | 11/1985 | Ermanski | 248/183 |
| 4,570,892 | 2/1986 | Czech et al. | 248/183 |
| 4,733,838 | 3/1988 | Van der Lely | 248/131 |
| 4,738,422 | 4/1988 | Matheson et al. | 248/183 |
| 4,852,830 | 8/1989 | Howard et al. | 248/183 |
| 4,923,154 | 5/1990 | Knokel | 248/131 |
| 5,161,766 | 11/1992 | Arima | 248/131 |
| 5,168,423 | 12/1992 | Ohgami et al. | 361/681 |
| 5,246,240 | 9/1993 | Romich et al. | 248/919 |
| 5,275,482 | 1/1994 | Grant | 248/917 |
| 5,345,362 | 9/1994 | Winkler | 361/681 |
| 5,425,460 | 6/1995 | Barbarian | 248/131 |
| 5,487,521 | 1/1996 | Callahan | 248/917 |
| 5,582,373 | 12/1996 | Baudot | 248/917 |
| 5,588,625 | 12/1996 | Beak | 248/923 |
| 5,701,347 | 12/1997 | Daniels et al. | 361/683 |
| 5,769,369 | 6/1998 | Meinel | 248/917 |

FOREIGN PATENT DOCUMENTS

| | | | |
|---|---|---|---|
| 405011885 | 1/1993 | Japan | 361/681 |

*Primary Examiner*—Lynn D. Feild
*Assistant Examiner*—Lisa Lea-Edmonds
*Attorney, Agent, or Firm*—Pro-Techtor International Services

[57] ABSTRACT

A base for liquid crystal display, including a support board, a pivot device and a base seat. The bottom end of the support board is bent in accordance with the angle of the display. The upper end of the pivot device is connected with the lower end of the support board, while the lower end of the pivot device is connected with a rotary disc, whereby the pivot device can be inclined up and down and rotated left and right. The base seat is connected with the bottom end of the support board. The base seat is formed with receptacles for receiving accessories tidily. The display is connected on the support board, whereby by means of the cooperation of the support board, pivot device and the base seat, the display can be freely adjusted by any angle.

4 Claims, 4 Drawing Sheets

BASE FOR LIQUID CRYSTAL DISPLAY HAVING RECEPTACLE FOR ACCESSORIES

BACKGROUND OF THE INVENTION

The present invention relates to a base for liquid crystal display, in which the base seat is formed with receptacles for tidily receiving accessories such as a transformer, a rectifier, etc.

A conventional base for liquid crystal display is merely used to support the display. In order to stably support the display, such base has a considerably large area and occupies much room. In cooperation with the display, many accessories such as a transformer, a rectifier, etc are used and placed randomly beside the display. This often affects the operation of the display.

SUMMARY OF THE INVENTION

It is therefore a primary object of the present invention to provide a base for liquid crystal display, in which the base seat is formed with receptacles for tidily and collectively receiving the accessories so as to avoid affection on the operation of the display.

The present invention can be best understood through the following description and accompanying drawings, wherein:

DETAILED DESCRIPTION OF THE PREFERRED EMBODIMENT

Figure 1:
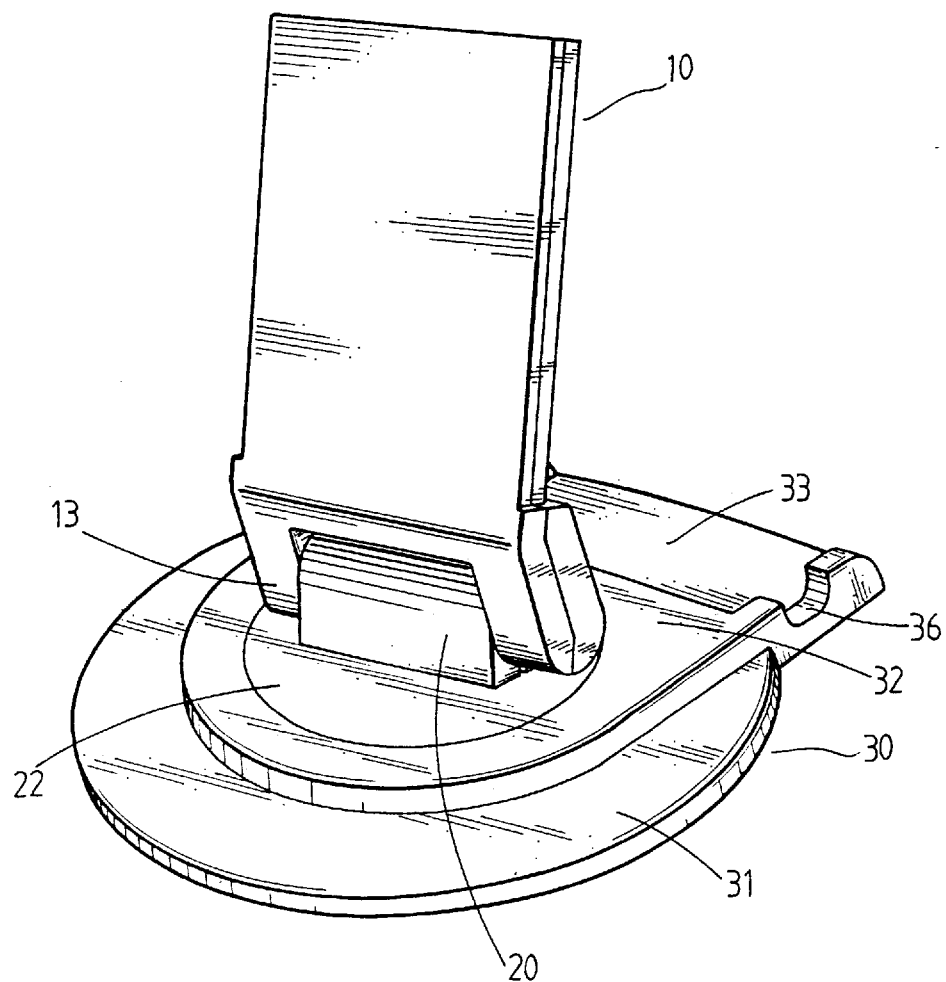
FIG. 1 is a perspective view of the present invention.
Figure 2:
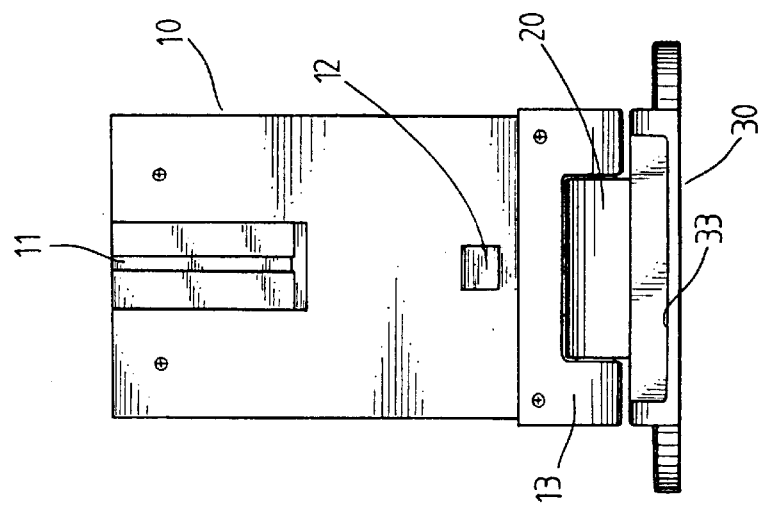
FIG. 2 is a front view of the present invention.
Figure 3:
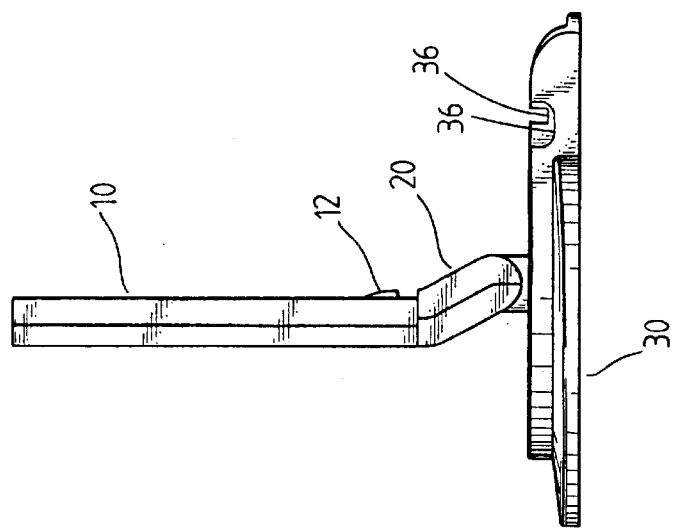
FIG. 3 is a left view of the present invention.
Figure 4:
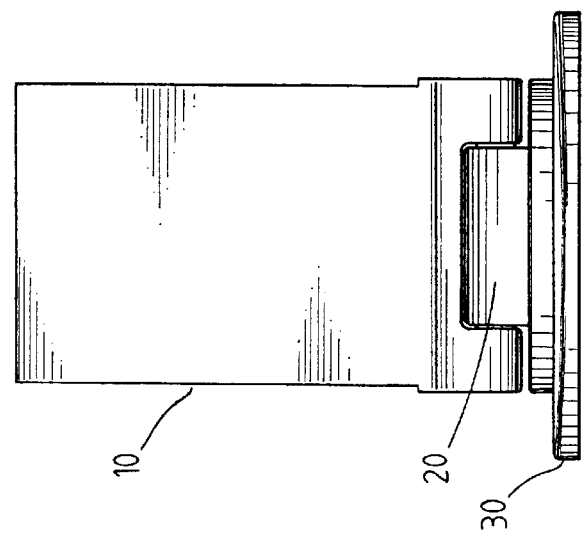
FIG. 4 is a rear view of the present invention.
Figure 5:
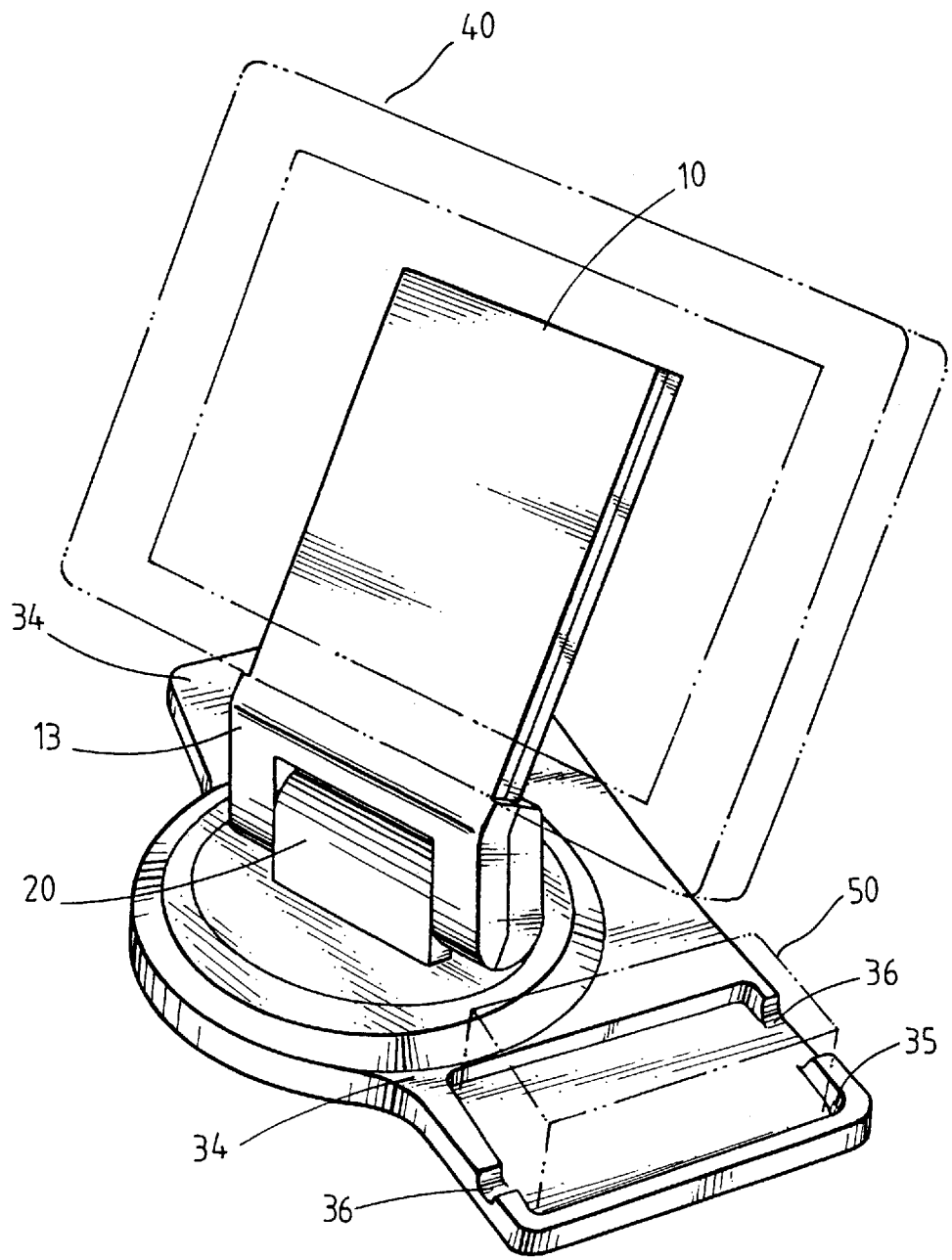
FIG. 5 shows the application of the present invention.

Please refer to FIGS. 1 to 4. The present invention includes a support board 10, a pivot device 20 and a base seat 30. The bottom end of the support board 10 is bent in accordance with the angle of the display. The upper end of the support board 10 is disposed with an insertion channel 11 and the lower end thereof is disposed with a resilient engaging key 12. Two lugs 13 extend from the lower end of the support board 10 for pivotally connecting with the pivot device 20. The pivot device 20 is disposed with a rotary disc 22 at the bottom for resting on the base seat 30, whereby the support board 10 can be inclined and rotated. The base seat 30 is formed with a disc body 31. A rear side of the base seat 30 is formed with a plane face 32 having a receptacle 33. Alternatively, the left and right sides of the disc body 31 are disposed with outward extending plane faces 34 (as shown in FIG. 5) and each plane face 34 is formed with a receptacle 35. The edges of the receptacles 33, 35 are formed with multiple notches 36 for arranging the wires.

Figure 6:
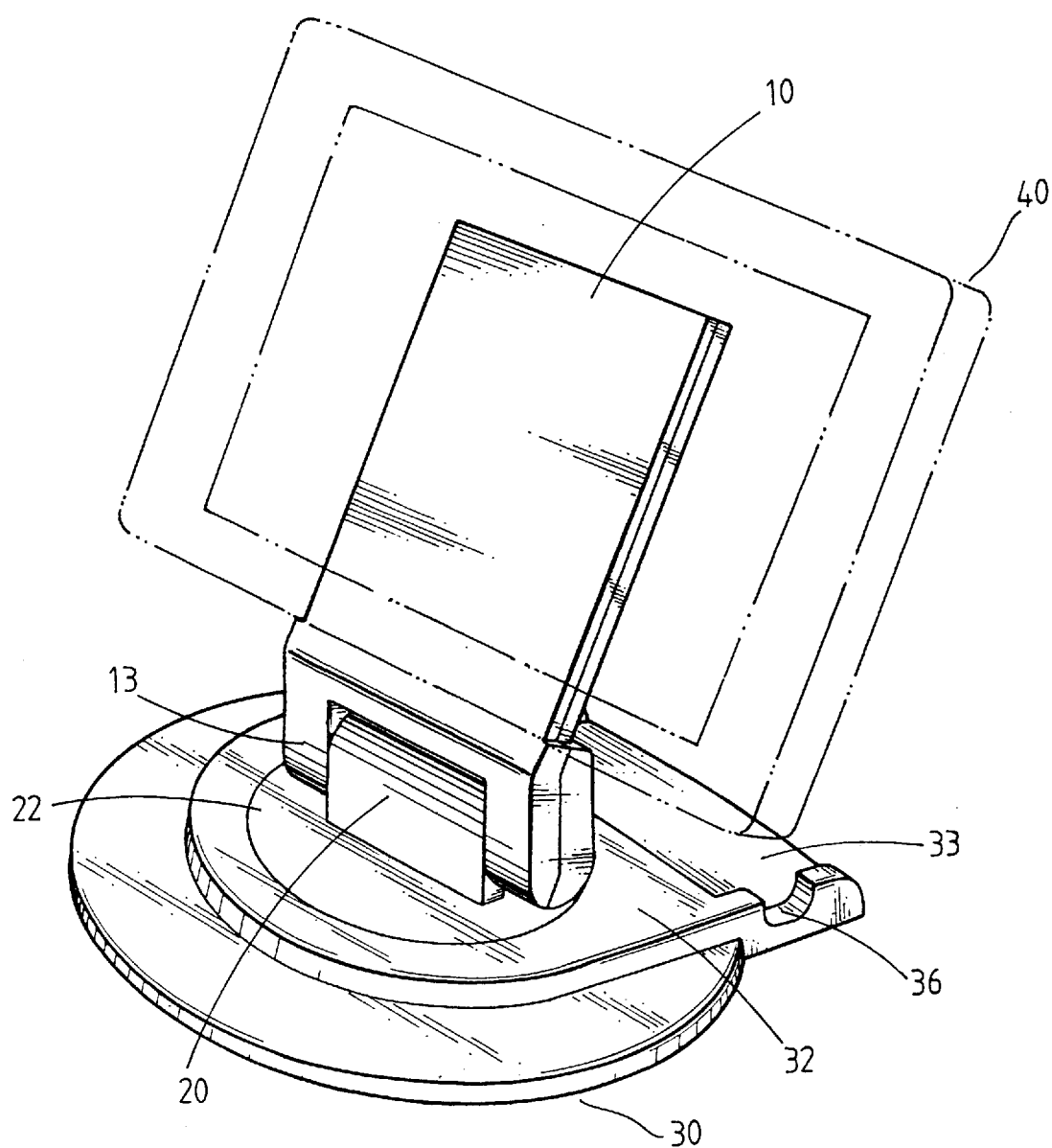
FIG. 6 shows another embodiment of the present invention.

Referring to FIGS. 5 and 6, the support board 10 is inserted in a channel of a back side of the liquid crystal display 40 with the engaging key 12 of the support board 10 engaged in an insertion hole of the display 40. By means of the pivot device 20 between the support board 10 and the base seat 30, the display 40 can be adjusted by any angle. In addition, the rotary disc 22 enables the base seat 30 to be rotated as necessary. The receptacles 33, 35 of the base seat 30 are for collectively placing a transformer or a rectifier or other accessories therein. The wires of the above accessories can be fixed in the notches 36 tidily.

It should be noted that the above description and accompanying drawings are only used to illustrate one embodiment of the present invention, not intended to limit the scope thereof. Any modification of the embodiment should fall within the scope of the present invention.

What is claimed is:

1. A base to receive a display, comprising:

a support board to receive the display, the support board supports lower and rear sides of the display, the support board extends along a central area of the rear side of the display; and a base seat pivotally connected to a bottom end of the support board by a pivot device, a rear side of a periphery of the base seat being formed with at least one receptacle adapted to receive accessories.

2. The base as claimed in claim 1, wherein a left side and a right side of the base seat each includes a receptacle.

3. The base as claimed in claim 2, wherein at least one side of one of the receptacles is formed with multiple notches on an upper surface thereof, the notches being adapted to secure wires external to the display.

4. The base as claimed in claim 1, wherein at least one side of the receptacle is formed with multiple notches on an upper surface thereof, the notches being adapted to secure wires external to the display.

* * * * *